(12) United States Patent
Yamada et al.

(10) Patent No.: US 6,901,943 B2
(45) Date of Patent: Jun. 7, 2005

(54) APPARATUS FOR INHIBITING FUELS FROM FLOWING OUT OF FUEL TANKS

(75) Inventors: Norihiro Yamada, Aichi-ken (JP); Eishin Mori, Aichi-ken (JP); Keisuke Yoshida, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/612,088

(22) Filed: Jul. 3, 2003

(65) Prior Publication Data
US 2004/0003844 A1 Jan. 8, 2004

(30) Foreign Application Priority Data
Jul. 5, 2002 (JP) ........................................ 2002-197524

(51) Int. Cl.[7] .............................................. F16K 24/04
(52) U.S. Cl. ........................................ 137/202; 137/43
(58) Field of Search .................................. 137/43, 202

(56) References Cited

U.S. PATENT DOCUMENTS 5,449,029 A 9/1995 Harris 6,708,713 B1 * 3/2004 Gericke ........................ 137/202
2003/0098063 A1 * 5/2003 Mori et al. ................... 137/202

FOREIGN PATENT DOCUMENTS

| JP | A-2-112658 | 4/1990 |
| JP | A-8-105571 | 4/1996 |
| JP | A-11-229984 | 8/1999 |

* cited by examiner

*Primary Examiner*—Gerald A. Michalsky
(74) *Attorney, Agent, or Firm*—Posz Law Group, PLC

(57) ABSTRACT

An apparatus is for inhibiting fuels from flowing out of fuel tanks, and includes a housing and a floating valve. The housing has an evaporator opening, and a major through hole communicating the inside of the housing with the outside and having an opening width sharply reducing from wide to narrow in the direction from the bottom end to the top end. The apparatus detects that the fuel tank is filled up with a liquid fuel by increasing a gas pressure within the fuel tank when the liquid-fuel level is placed adjacent to the top end of the major through hole, and closes the evaporator opening with the floating valve when the level of the liquid fuel rises abnormally.

7 Claims, 4 Drawing Sheets

APPARATUS FOR INHIBITING FUELS FROM FLOWING OUT OF FUEL TANKS

BACKGROUND OF THE INVENTION

1. Field of the Invention

The present invention relates to structural improvements on cut-off valves and means for detecting whether fuel tanks are filled up with fuels, cut-off valves and means which are disposed on automobile fuel tanks.

2. Description of the Related Art

In the vicinity of automobile fuel tanks, a vaporized-fuel circulating system, a so-called evaporator circuit, is disposed. The evaporator circuit leads vaporized fuels from fuel tanks to external canisters. The vaporized fuels are then adsorbed to activated carbon and the like, and are stored temporarily therein. Thus, the evaporator circuit inhibits the pressure increment within fuel tanks, pressure increment which results from the increment of vapor pressure. The canisters are connected with engines, and engines exert an inlet negative pressure to release the adsorbed vaporized fuels from activated carbon to mix them into an air-fuel mixture. Accordingly, the adsorbed vaporized fuels are used again as fuels.

The evaporator circuit is naturally provided with an opening, a so-called evaporator opening, which is formed in fuel tanks. The evaporator opening is generally formed at the uppermost portion of fuel tanks in order to inhibit liquid fuels from flowing into the evaporator circuit. However, when the level of liquid fuels move up and down, there might arise a fear that liquid fuels flow into the evaporator circuit through the evaporator opening. If liquid fuels flow even into the canister, they adsorb onto the activated carbon so that they might impair the usual vaporized fuel-adsorbing action of the activated carbon.

Hence, the evaporator opening has been conventionally provided with a variety of cut-off valves. As for the cut-off valves, floating valves have been often used as described later. When the level of liquid fuels rises abnormally, the floating valves float upward by buoyancy to close the evaporator opening. Consequently, the floating valves inhibit liquid fuels from flowing into the evaporator circuit.

Moreover, fuel tanks are provided with means for detecting whether fuel tanks are filled up with fuels when fuels are supplied. As for the means for detecting filled-up fuel tanks, apparatuses comprising a floating valve have been often used as described later. The floating valve closes an opening of fuel tanks to heighten the pressure within fuel tanks. Thus, fuel supply guns are turned off automatically.

For example, Japanese Unexamined Patent Publication (KOKAI) No. 11-229,984 discloses an apparatus for inhibiting fuels from flowing out. The flow-out fuel inhibitor apparatus is provided with a shut-off valve and a cut-off valve. The shut-off valve lets a gas, which includes a fuel vapor generating in a large volume, flow to a canister when a fuel is supplied. The cut-off valve lets a gas, which includes a fuel vapor, flow to a canister when a fuel is not supplied. The flow-out fuel inhibitor apparatus produces an advantage that the number of component parts and the number of sealed portions can be reduced, because the shut-off valve, operating when a fuel is supplied, and the cut-off valve, operating when a fuel is not supplied, are accommodated in a housing.

However, the above-described flow-out fuel inhibitor apparatus requires two floating valves and two communication passages, respectively. Accordingly, there arises a problem that it is difficult to design so as to make each of them operate accurately. Moreover, the flow-out fuel inhibitor apparatus suffers from a drawback that the cost involved has gone up, because it requires two floating valves to result in increasing the number of component parts. In addition, the flow-out fuel inhibitor apparatus has a problem with a considerably limited disposition space, because it has an enlarged overall diameter.

Still further, when the above-described flow-out fuel inhibitor apparatus is applied to a variety of fuel tanks whose shape and capacity differ with each other, it is needed to manufacture a diversity of the flow-out fuel inhibitor apparatuses by varying the shapes of housing and float variously. Thus, there arises a drawback that the man-hour requirement for the manufacture has gone up enormously.

Hence, Japanese Unexamined Patent Publication (KOKAI) No. 8-105,571 discloses another apparatus for inhibiting fuels from flowing out. As illustrated in FIG. 6, the flow-out fuel inhibitor apparatus comprises a casing 100, a floating valve 200, a hole 101 with a larger opening area, and a hole 102 with a smaller opening area. The floating valve 101 is disposed in the casing 100. The hole 101 is formed in the bottom of the casing 100. The hole 102 is formed in the top of the casing 100.

The flow-out fuel inhibitor apparatus operates as hereinafter described. When a fuel is supplied, air within a fuel tank 300 is emitted in the following manner as the level of the liquid fuel rises. The air passes through the hole 101 having a larger opening area and hole 102 having a smaller opening area of the casing 100. Then, the air is emitted into a liquid reservoir 105 through an opening 104 by way of a gap 103, into an opened differential-pressure valve 106, into a gap 107, and into a pipe 108 which is connected to a canister and the like. Thereafter, when the hole 101 with a larger opening area is placed below the level of the liquid fuel, the air within the fuel tank 300 is emitted by way of the hole 102 with a smaller opening area alone. However, when the air is emitted through the hole 102 having a smaller opening area only, the air emission is decreased so less that the pressure increases within the fuel tank 300 to actuate a mechanism for turning off a fuel supply gun.

Subsequently, it is possible adjust the level of the liquid fuel to a filled-up liquid-level height "L2" by supplying the fuel with a slow rate which is reduced in accordance with the volume of the air emitted through the hole 102 having a smaller opening area. Moreover, when the level of the liquid fuel exceeds the filled-up liquid-level height "L2," it is possible to inhibit the fuel from entering the pipe 108 which is communicated with the opening 104, because the opening 104, through which the air within the fuel tank 300 is emitted when the fuel is supplied, is closed by the floating valve 200.

However, in the flow-out fuel inhibitor apparatus disclosed in Japanese Unexamined Patent Publication (KOKAI) No. 8-105,571, when the fuel is supplied, the decrement of the air-flow or ventilation area is so less with respect to the level of the liquid fuel that the increment extent of the pressure within the fuel tank 300 fluctuates greatly depending on the fuel supply flow rates. Specifically, the smaller the fuel supply flow rate is, the higher the liquid-level height is placed at which the fuel supply gun turning-off mechanism actuates. Therefore, in the following gentle fuel supply, there arises a drawback that the supply amount of the fuel is unstable.

SUMMARY OF THE INVENTION

The present invention has been developed in view of such circumstances. It is therefore a primary object of the present to provide a flow-out fuel inhibitor apparatus which can securely raise the level of liquid fuels to a filled-up position when a fuel supply gun turning-off mechanism actuates. Moreover, it is a secondary object of the present invention to make it possible to detect whether a floating valve closes an evaporator opening (or a cut-off position) and whether a fuel tank is filled up with fuels (or a filled-up position) with a much simpler arrangement, thereby making the flow-out fuel inhibitor apparatus applicable to a variety of fuel tanks with ease.

An apparatus according to the present invention is for inhibiting fuels from flowing out of fuel tanks, and can achieve the aforementioned objects. The present flow-out fuel inhibitor apparatus comprises:

a housing fixed to a top of a fuel tank, and having an evaporator opening communicating with a canister; and a floating valve accommodated in the housing, floating on a liquid fuel, and moving up and down in accordance with up-and-down movements of a level of the liquid fuel to open or close the evaporator opening;

the housing further having a major-diameter major through hole disposed in a side surface of the housing, communicating the inside of the housing with the outside and having an opening width sharply reducing from wide to narrow in the direction from a bottom end thereof to a top end thereof, whereby detecting that the fuel tank is filled up with the liquid fuel by increasing a gas pressure within the fuel tank when the level of the liquid fuel within the fuel tank is placed adjacent to the top end of the major through hole, and closing the evaporator opening with the floating valve when the level of the liquid fuel rises abnormally.

Moreover, an opening of the major through hole can desirably be formed as a substantially triangular shape, one of whose apexes pointing upward and two of whose sides extending from the upward-pointing apex to the bottom side are formed as a downwardly-convexed arc, at an upper portion thereof at least.

In addition, the floating valve can desirably be provided with a cylinder formed on an outer periphery thereof, opened upward and disposed within the housing. Additionally, the housing can further have a minor-diameter minor through hole disposed in a side surface of the housing and in the vicinity of a top inner surface of the fuel tank and communicating the inside of the housing with the outside. Note that the minor-diameter minor through hole is not required necessarily when the present flow-out fuel apparatus serves as a valve only for detecting whether fuel tanks are filled up with liquid fuels. Even if such is the case, the housing can preferably further have the minor-diameter minor through hole in order to inhibit the floating valve from being kept adhering to the evaporator opening. Note that the minor-diameter minor through hole functions as a bleed hole when the present flow-out fuel apparatus serves as a cut-off valve as well. If such is the case, it is important to appropriately design the opening area of the minor-diameter minor through hole.

In accordance with the present flow-out fuel inhibitor apparatus, it is possible to detect that the level of the liquid fuel is placed at the filled-up position when fuel supply guns are turned off automatically. Further, the present flow-out fuel inhibitor apparatus is an integral independent device which can carry out detecting whether fuel tanks are filled up with fuels, and which can carry out cutting off flowing out fuels or inhibiting fuels from flowing out by closing the evaporator opening with the floating valve automatically. Furthermore, the present flow-out fuel inhibitor apparatus can be disposed in fuel tanks through an opening formed in fuel tanks so that it produces an advantageous effect greatly in view of saving the boarding space. Moreover, in the present flow-out fuel inhibitor apparatus, it is possible to adjust the position for detecting filled-up fuel tanks by simply adjusting the position or opening shape of the major through hole. In addition, even when the position for cutting off flowing out fuels (or the position for inhibiting fuels from flowing out) and the position for detecting filled-up fuel tanks are disposed in proximity to each other, it is possible to design fuel tanks with less man-hour requirement and to remarkably reduce the cost involved, because the present flow-out fuel inhibitor apparatus can be shared by a variety of fuel tanks.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
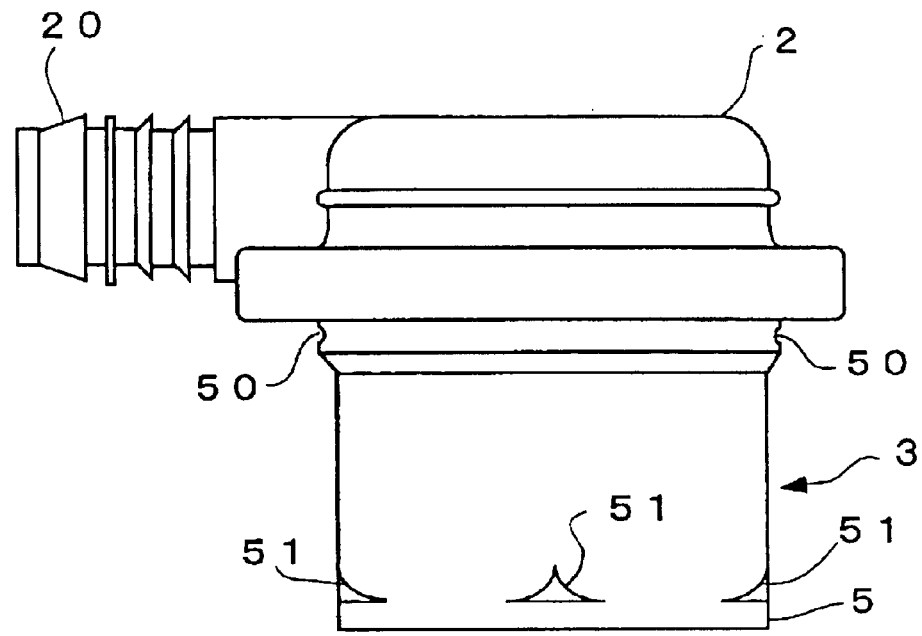
FIG. 1 is a front view of a flow-out fuel inhibitor apparatus according to Example No. 1 of the present invention.

Having generally described the present invention, a further understanding can be obtained by reference to the specific preferred embodiments which are provided herein for the purpose of illustration only and not intended to limit the scope of the appended claims.

It is possible to think of the following mock flow-out fuel inhibitor apparatus in order to achieve the aforementioned secondary object. The flow-out fuel inhibitor apparatus comprises a housing, a floating valve, and a cylinder. The housing is fixed to a top of a fuel tank, and has an evaporator opening communicating with a canister. The floating valve is accommodated in the housing, floats on a liquid fuel, moves up and down in accordance with up-and-down movements of a level of the liquid fuel to open or close the evaporator opening. The housing further has a minor-diameter minor through hole and a cylinder. The minor through hole is formed in the vicinity of a top inner surface of the fuel tank, and communicates the inside of the housing with the outside. The cylinder extends downward from the housing into the fuel tank, and has an opening at the bottom end. When the housing is provided with such a cylinder, upon the level of the liquid fuel within the fuel tank reaching the bottom-end opening of the cylinder, the gas including the vaporized fuel within the fuel tank is emitted through the minor-diameter through hole only. Accordingly, the ventilation resistance exerted to the gas increases sharply. Therefore, a differential pressure arises between the gas pressure within the fuel tank and the gas pressure within the housing. Consequently, the level of the liquid fuel within the cylinder rises above the level of the liquid fuel within the fuel tank. As a result, the floating valve ascends to close the evaporator opening so that the gas pressure within the fuel tank increases. Thus, the mock flow-out fuel inhibitor apparatus can promote to automatically turn off fuel supply guns.

However, depending on the types of fuel tanks, the filled-up detecting position (i.e., the liquid level at which the gas pressure within a fuel tank heightens to automatically turn off a fuel supply gun) and the cut-off position (i.e., the liquid level at which a floating valve closes an evaporator opening) might be disposed in proximity to each other. If such is the case, the length of the cylinder should be shorted so that the fuel volume hoisted by the differential pressure is less within the cylinder. Accordingly, no sufficient buoyancy acts onto the floating valve so that it is difficult to detect whether the fuel tank is filled up with the liquid fuel. Consequently, it is required to horizontally enlarge the volume of the floating valve. However, when the volume of the floating valve is thus enlarged, the floating valve requires an enlarged area for installing it to the fuel tank. Thus, it is difficult for a variety of fuel tanks to share the mock flow-out fuel inhibitor apparatus.

Hence, in the present flow-out fuel inhibitor apparatus, the housing has a minor-diameter minor through hole, and a major-diameter major through hole. The minor through hole is disposed in a side surface of the housing and in the vicinity of a top inner surface of the fuel tank, and communicates the inside of the housing with the outside. The major through hole is disposed in a side surface of the housing and below the minor through hole, communicates the inside of the housing with the outside, and has an opening width sharply reducing from wide to narrow in the direction from a bottom end thereof to a top end thereof.

In accordance with the present flow-out fuel inhibitor apparatus, the floating valve is held within the housing by its own weight in the same manner as conventional flow-out fuel inhibitor apparatuses when the level of the liquid fuel is placed downward in the housing under normal operating circumstances and fuel supply circumstances. Accordingly, the evaporator opening is opened to communicate the fuel tank with the canister. Therefore, the gas within the fuel tank passes the housing through the major through hole, and flows into the canister through the evaporator opening. Thus, the gas pressure within the fuel tank can be adjusted.

After the level of the liquid fuel within the fuel tank rises to arrive at the opening position of the major through hole under fuel supply circumstances, the opening area of the major through hole is reduced by the rising level of the liquid fuel. Accordingly, the ventilation resistance is exerted more to the gas flowing through the major through hole. Moreover, the major through hole has an opening width sharply reducing from wide to narrow in the direction from a bottom end thereof to a top end thereof. For example, the major through hole can preferably be formed as a substantially triangular shape whose base length "l" and height "h"; and the ratio of "l" with respect to "h" can preferably fall in a range of from more than 1 (not inclusive) to less than 3 (not inclusive), i.e., $1<$"l"/"h"$<3$, further preferably from more than 1 (not inclusive) to less than 2 (not inclusive), i.e., $1<$"l"/"h"$<2$. In this instance, it is furthermore preferred that a side of the substantially triangular shape can be formed as an arc whose radius is from 5 to 50 mm, further preferably from 10 to 40 mm, furthermore preferably from 10 to 30 mm. Consequently, the ventilation resistance exerted to the gas flowing through the major through hole is enlarged sharply. Meanwhile, the ventilation resistance is exerted greatly to the gas flowing through the minor through hole. Therefore, when the level of the liquid fuel is placed adjacent to the top end of the major through hole, a large differential pressure arises between the vapor phase within the fuel tank and the vapor phase within the housing. Accordingly, the level of the liquid fuel within the housing is placed higher than the level of the liquid fuel within the fuel tank. Thus, the floating valve ascends to close the evaporator opening, thereby shutting off the ventilation of the vaporized gas. Consequently, the pressure within the fuel tank increases so that the present flow-out fuel inhibitor apparatus can promote to automatically turn off fuel supply guns. Specifically, in accordance with the present flow-out fuel inhibitor apparatus, it is possible to detect whether the fuel tank is filled up with the liquid fuel by means of the major through hole. As a result, it is possible to adjust the level of the liquid fuel which tells the position for detecting filled-up fuel tanks by simply adjusting the top-end position of the major through hole or adjusting the opening shape thereof.

Note that the expression, "the level of the liquid fuel is placed adjacent to the top end of the major through hole," is synonymous with the expression, "the level of the liquid fuel rises to make the opening area of the major through hole a predetermined value or less."

On the other hand, when the level of the liquid fuel rises abnormally to float the floating valve upward upon accelerating or rolling over vehicle in driving, the floating valve is pressed onto the evaporator opening by the buoyant force so that the evaporator opening is closed to disconnect the fuel tank with the canister. Thus, the liquid fuel is inhibited from entering the evaporator opening and then flowing into the canister. Hence, the floating valve serves as a cut-off valve.

The housing can be disposed integrally with the fuel tank, or can be disposed independently of the fuel tank. Further, the housing can be disposed within the fuel tank where the vapor phase of the fuel exists, or can be disposed so as to penetrate a top wall of the fuel tank. Furthermore, the method of fixing the housing to the fuel tank is not limited in particular, for example, the housing can be fastened to the fuel tank by means of welding or bolt, or the housing can be formed integrally with the fuel tank. The evaporator opening communicating with the canister is positioned at the uppermost portion of the housing in general. However, the position of the evaporator opening is not limited in particular, as far as the evaporator opening is placed where the floating valve can close the evaporator opening when the floating valve ascends by buoyancy. Moreover, the evaporator opening communicating with the canister can be formed as any shapes which the floating valve can close.

The housing can be enclosed at the bottom, however, can preferably have an opening at the bottom, opening which communicates with the fuel tank. With such an arrangement, the gas and liquid fuel within the fuel tank is more likely to go into the housing. As a result, the accuracy is improved when detecting whether the fuel tank is filled up with the liquid fuel. Note that it is permissible to provide the lower portion of the housing with the above-described cylinder of the mock flow-out fuel inhibitor apparatus.

As far as the major-diameter major through hole formed in a side surface of the housing exerts such a less ventilation resistance to the gas within the fuel tank so that the gas can pass through it with ease, and as far as it is formed as a shape whose opening width sharply reduces from wide to narrow in the direction from a bottom end thereof to a top end thereof, the diameter and quantity are not limited in particular. However, in order to make the gas flow more smoothly under normal operating circumstances and fuel supply circumstances, a plurality of the major through holes can preferably be formed on the identical horizontal plane in a side surface of the housing. Moreover, the opening area of the major through holes can preferably be 40 $mm^2$ or more, further preferably from 40 to 160 $mm^2$, furthermore preferably from 40 to 120 $mm^2$, for each of them. For example, when 4 major through holes are formed, the summed opening area can be 160 $mm^2$ or more. In this instance, the average value of the opening areas of the major through holes can be 40 $mm^2$ or more. The major through hole is positioned so that the top end can be disposed adjacent to a position where the level of the liquid fuel is placed when the fuel tank is filled up with the liquid fuel. The position of the major through hole depends on the capacity and shape of fuel tanks. However, in accordance with the present flow-out, fuel inhibitor apparatus, it is possible to detect whether the fuel tank is filled up with the liquid fuel by simply adjusting the position of the major through hole or adjusting the opening shape thereof. Therefore, when the major. through hole is left for post processing in which it is pierced in a side surface of the housing, the present flow-out fuel inhibitor apparatus can offer special convenience because it can be shared by a variety of fuel tanks.

Note that the shape of the major through hole is not limited in particular as far as the major through hole is formed as a shape whose opening width sharply reduces from wide to narrow in the direction from a bottom end thereof to a top end thereof. For example, the shape of the major through hole can be triangles, pentagons and diamonds. However, it is preferable to form the major through hole as a substantially triangular shape, one of whose apexes pointing upward, at an upper portion thereof where the opening area reduces sharply accompanied by the rising level of the liquid fuel. It is especially preferred that two sides of the triangular shape extending from the upward-pointing apex to the bottom side can be formed as a downwardly-convexed arc. When the major through hole is thus formed, it is possible to detect the position at which the fuel tank is filled up with the liquid fuel with high accuracy even if the fuel supply flow fluctuates. Note that, as far as a sufficient opening area is secured in the triangular shape, the major through hole can operate similarly even when it is formed as a substantially pentagonal shape in which an extra quadrangle-shaped opening is added to the triangular shape.

Figure 7:
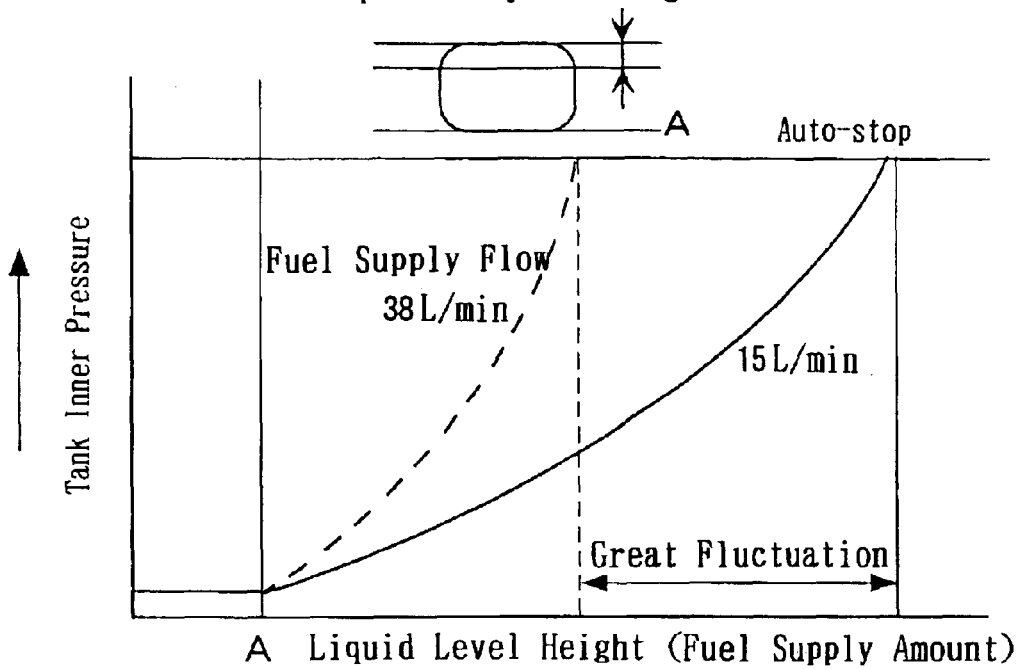
FIG. 7 is an explanatory diagram for illustrating how the accuracy of detecting the filled-up position depends on an opening shape of a major through hole.
Figure 8:
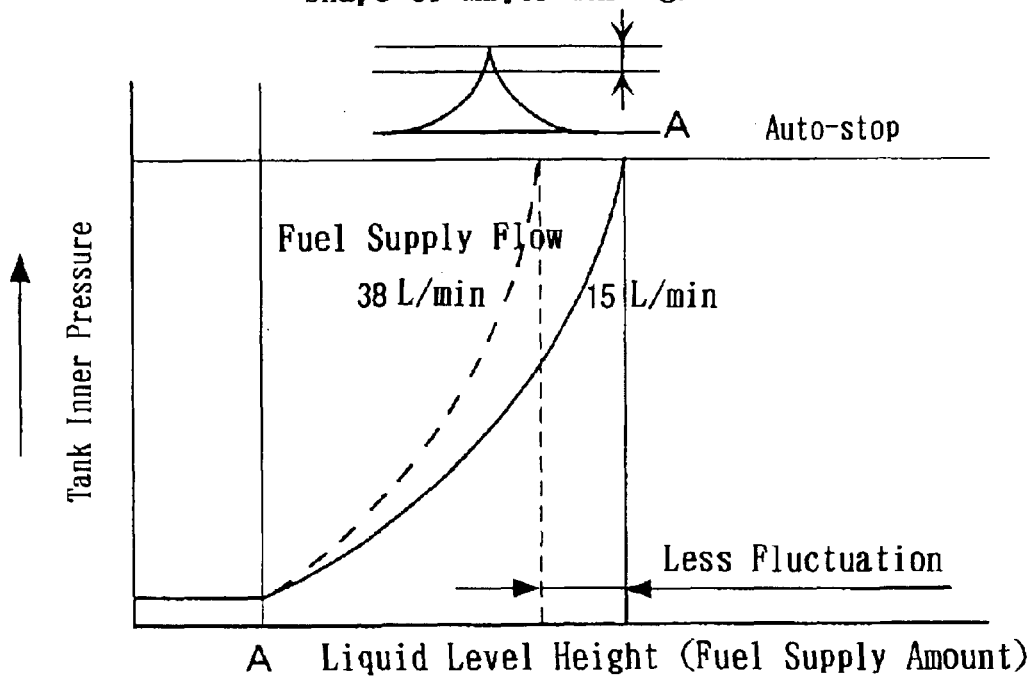
FIG. 8 is another explanatory diagram for illustrating how the accuracy of detecting the filled-up position depends on an opening shape of a major through hole.

For example, when the major diameter through hole is formed as a shape whose opening width reduces gently from wide to narrow in the direction from a bottom end thereof to a top end thereof as illustrated in FIG. 7, the decrement of the ventilation area is less with respect to the liquid-level height. Accordingly, the inner-pressure incremental extent within fuel tanks fluctuates greatly when the fuel supply flow fluctuates. Consequently, the less the fuel supply flow is, at the higher position fuel tanks are detected whether they are filled up with liquid fuels. On the contrarily, when the major diameter through hole is formed as a triangular shape whose opening width reduces sharply from wide to narrow in the direction from a bottom end thereof to a top end thereof as illustrated in FIG. 8, the decrement of the ventilation area is great with respect to the liquid-level height. Accordingly, the inner-pressure incremental extent within fuel tanks fluctuates less when the fuel supply flow fluctuates. Consequently, even when the fuel supply flow fluctuates, fuel tanks are detected with high accuracy whether they are filled up with liquid fuels.

The minor-diameter minor through hole formed in the housing communicates the inside of the fuel tank with the inside of the housing. It is important to appropriately design the diameter and quantity of the minor through hole. When the diameter of the minor through hole is too large, or when the quantity of the minor through holes is too much, it is difficult to increase the inner pressure within fuel tanks when fuel tanks are filled up with liquid fuels. Accordingly, it is difficult to automatically turn off fuel supply guns. Moreover, the liquid fuel might flow into the housing through the minor through hole and then flow to the canister.

Moreover, when the diameter of the minor through hole is too small, or when the quantity of the minor through holes is too less, it is difficult to flow the gas within fuel tanks to the canister when fuel tanks are filled up with liquid fuels. Accordingly, a drawback might arise to adversely affect when the floating valve serves as a cut-off valve to adjust the inner pressure within fuel tanks. Therefore, it is desirable that the diameter of the minor through hole can be such a minor diameter that gases can flow through the minor through hole but it is substantially difficult for liquid fuels to pass through the minor through hole. In addition, it is necessary to determine the quantity of the minor through holes by trial and error but precisely depending on the capacity of fuel tanks. For example, the diameter of the minor through hole can preferably be from 0.5 to 3.0 mm, further preferably from 1.0 to 2.0 mm. Note that it is desirable to dispose the minor diameter through hole as close as possible to the top surface of fuel tanks in order to inhibit liquid fuels from entering the housing.

The floating valve can be made from the same materials as conventional floating valves are made from, and can be formed as the same shapes as they are formed. Moreover, the floating valve can float upward by the difference between its specific gravity and the specific gravity of liquid fuels alone. Alternatively, the floating valve can use the urging force of urging means, such as springs, as an aid for the buoyancy.

The floating valve can desirably comprise a dual sealing construction, which is provided with an internal sealing member held movably in the vertical direction in the floating valve, as set forth in Japanese Unexamined Patent Publication (KOKAI) No. 2-112,658, for example. When the floating valve comprise such a construction, it is possible to inhibit such a drawback that the floating valve adheres to the evaporator opening communicating with the canister so that it fails to descend when the level of liquid fuels keep lowering. Accordingly, the floating valve is improved in terms of the dynamic sealing property when the level of liquid fuels waves violently. Consequently, the floating valve can serve as a cut-off valve more effectively.

It is desirable that the floating valve can be provided with a cylinder formed on an outer periphery thereof, opened upward, and disposed within the housing. When the floating valve is provide with such a cylinder, the cylinder contacts liquid fuels, coming through the minor-diameter minor through hole formed in the housing, to restrict the flow of liquid fuels. Accordingly, it is possible to inhibit liquid fuels from coming into the evaporator opening communicating with the canister. Consequently, it is possible to further restrict the flow of in-coming liquid fuels. The cylinder can preferably have such a height that it is disposed to protrude beyond the top surface of the floating valve when the floating valve is placed at the lowermost position under normal operating circumstances.

EXAMPLES

The present invention will be described in more detail with reference to specific embodiments.

Example No. 1

Figure 2:
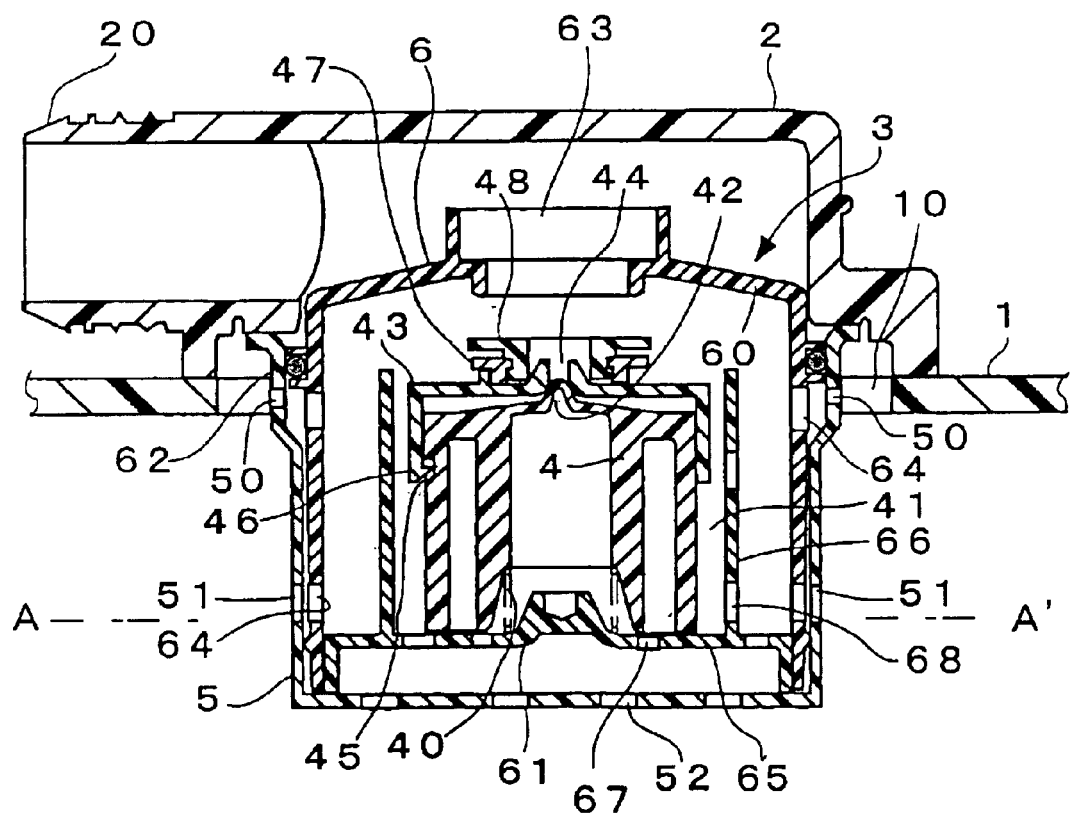
FIG. 2 is a cross-sectional view of the flow-out fuel inhibitor apparatus according to Example No. 1.

FIG. 1 illustrates a front view of a flow-out fuel inhibitor apparatus according to Example No. 1 of the present invention. FIG. 2 illustrates a cross-sectional view of the flow-out fuel inhibitor apparatus when it is installed to a gasoline tank. The flow-out fuel inhibitor apparatus comprises a lid 2, a housing 3, and a floating valve 4. The lid 2 is fixed to the top of an opening 10 by welding. The opening 10 is formed in the top surface of an automobile gasoline tank 1 made from resin. The housing 3 is fixed to the bottom surface of the lid 2 by welding. The floating valve 4 is disposed movably in the vertical direction in the housing 3.

The lid 2 is formed of polyethylene resin and polyamide resin by injection molding. The lid 2 is provided with a nipple 20. The nipple 20 protrudes parallel to the top surface of the gasoline tank 1, and is fitted into a tube which is connected with a canister.

The housing 3 is formed of polyamide resin by injection molding. The housing 3 has a dual structure which comprises an outer container 5 and an inner container 6.

The outer container 5 is formed as a box shape opened at the top end. The opened periphery of the outer container 5 is fixed by welding onto the bottom surface of the lid 2. In the side wall of the outer container 5, two minor-diameter minor through holes 50 are formed at intervals of 180° at positions which correspond to the uppermost portion of the gasoline tank 1. Note that the minor through holes 50 have a minor diameter of from 1 to 2 mm. Moreover, in the side wall of the outer container 5, 4 major-diameter major through holes 51 are formed at intervals of 90° at positions under the minor through holes 50. Note that the major through holes 51 have an opening area of 40 mm². The opening of the major through holes 51 is formed as a substantially triangular shape, one of whose apexes pointing upward and two of whose sides extending from the upward-pointing apex to the bottom side are formed as a downwardly-convexed arc as illustrated in FIG. 1 or 8. Note that the radius of the arc shape can preferably be from 5 to 50 mm, further preferably from 10 to 40 mm, furthermore preferably from 10 to 30 mm. In addition, a plurality of communication holes 52 are formed in the bottom of the outer container 5. The communication holes 52 communicate the inside of the outer container 5 with the outside.

The inner container 6 includes an upper member 60, and a lower member 61. The upper member 60 is formed as an inverted mug shape. The lower member 61 is fixed by engagement onto the bottom-end opening of the upper member 60. The upper member 60 contacts with the bottom of the outer container 5 at the bottom end, and also contacts with the inner peripheral wall of the outer container 5 at the outer peripheral surface by way of an O-ring 62 in an air proof manner. Thus, the upper member 60 is held and fixed in the outer container 5. Moreover, an evaporator opening 63 communicating with the canister is formed in the uppermost portion of the upper member 60. In addition, upper and lower communication holes 64 communicating the inside of the upper member 60 with the outside are formed in the peripheral wall of the upper member 60 at upper positions facing the minor through holes 50 and at lower positions facing the major through holes 51, respectively. Thus, the inside of the housing 3 communicates with the inside of the gasoline tank 1 byway of the minor through holes 50 and major through holes 51 as well as upper and lower communication holes 64.

The lower member 61 includes an end plate 65, and a cylinder 66. The end plate 65 is fixed by engagement in the bottom-end opening of the upper member 60. The cylinder 66 projects upward from the end plate 65. In the end plate 65, a plurality of communication holes 67 are formed to pierce the top and bottom surfaces of the end plate 65. In the cylinder 66, a plurality of communication holes 68 are formed to communicate the inside of the cylinder 66 with the outside.

The floating valve 4 is placed by way of a spring 40 on the top surface of the end plate 65 within the cylinder 66. On the outer peripheral surface of the floating valve 4, a plurality of ribs 41 extending in the vertical direction are formed. The floating valve 4 can move in the vertical direction within the cylinder 66 while the ribs 41 are brought into contact with and guided on the inner peripheral surface of the cylinder 66. Moreover, at the top end of the floating valve 4, a sealing protrusion 42 is formed. In addition, around the upper portion of the floating valve 4, a second sealing member 43 is held relatively movably in the vertical direction. The second sealing member 43 is formed as a cylinder shape bottomed at the top or an inverted cup shape. In the middle of the second sealing member 43, a through sealing hole 44 is formed to face the sealing protrusion 42.

The second sealing member 43 is disposed so as to face the bottom end upward, and is held onto the floating valve 4. On the outer peripheral surface of the floating valve 4, a plurality of engagement grooves 45 are formed, and engage with claws 46 which are formed on the opening end of the second sealing member 43. The engagement grooves 45 are formed vertically longer than the claws 46. Accordingly, the second sealing member 43 can move slightly relatively in the vertical direction with respect to the floating valve 4. When the floating valve 4 and second sealing member 43 move relatively in the direction approaching to each other, the sealing protrusion 42 of the floating valve 4 closes the sealing hole 44 to seal the sealing hole 44.

The floating valve 4 and second sealing member 43 are formed of polyoxymethylene (POM) resin. The shapes and apparent specific gravities are designed so that their apparent specific gravities are smaller than that of gasoline and the floating valve 4 and second sealing member 43 can float on liquid gasoline by the urging force of the spring 40. The spring 40 is held between the bottom end of the floating valve 4 and the end plate 65 of the inner container 6 in such a state that the spring 40 accumulates the urging force. However, the urging force is smaller than the sum of the weights of the floating valve 4 and second sealing member 43. Accordingly, in air and gasoline vapor, the floating valve 4 and second sealing member 43 press the spring 40 by their own weights so that the bottom-end surface of the floating valve 4 contacts with the end plate 65 of the inner container 6.

On the top surface of the second sealing member 43, a ring-shaped valve seat 47 is fixed by welding. The valve seat 47 is fixed by engagement to a valve body 48 made from rubber. When the second sealing member 43 ascends as the floating valve 4 ascends, the valve body 48 contacts with the bottom-end surface of the evaporator opening 63 communicating with the canister to seal the evaporator opening 63.

In the thus constructed flow-out fuel inhibitor apparatus according to Example No. 1, the summed weight of the floating valve 4, second sealing member 43, valve seat 47, valve body 48 and spring 40 overcomes the urging force of the spring 40 when the level of the liquid gasoline is below the floating valve 4 under steady ordinary circumstances. Accordingly, a clearance is formed between the valve body 48 and the bottom-end surface of the evaporator opening 63 as illustrated in FIG. 2. Therefore, the gas within the gasoline tank 1 passes the communication holes 64 and 67 to enter the inner container 6 through the minor through holes 50 and major through holes 51 or the communication holes 52 formed in the bottom of the outer container 5. Then, the gas passes the nipple 20, and flows into the canister. Thus, it is possible to inhibit the gas pressure within the gasoline tank 1 from heightening.

On the other hand, when vehicles travel on roads with large irregularities, or when they travel on curved roads, the level of the liquid gasoline waves greatly. Accordingly, even if the level of the liquid gasoline is placed below positions at which the floating valve 4 floats under steady circumstances, the liquid gasoline might enter the housing 3 through the minor through holes 50 and major through holes 51 or the communication holes 52 formed in the bottom of the outer container 5. However, in the flow-out fuel inhibitor apparatus according to Example No. 1, the floating valve 4 and second sealing member 43 float upward by the liquid gasoline in such an instance. Consequently, the valve body 48 closes the evaporator opening 63. As a result, it is possible to inhibit the liquid gasoline from flowing into the canister. Moreover, even if the valve body 48 adheres to the evaporator opening 63, the floating valve 4 descends to separate the second sealing member 43 from the floating valve 4 to open the sealing hole 44 when the level of the liquid gasoline descends. Accordingly, the pressure within the housing 3 is equalized with the pressure on the side of the nipple 20 communicating with the canister. Consequently, the valve body 48 separates from the evaporator opening 63 with ease. As a result, the flow-out fuel inhibitor apparatus according to Example No. 1 is highly responsive, and is good in terms of the dynamic sealing property when the level of the liquid gasoline waves greatly.

Moreover, in supplying the gasoline, when the level of the liquid gasoline within the gasoline tank 1 is placed below the bottom end of the major through holes 51, the gas existing in the vapor phase within the gasoline tank 1 flows into the housing 3 through the minor through holes 50 and major through holes 51 or the communication holes 52 formed in the bottom of the outer container 5 to flow toward the canister as the level of the liquid gasoline descends. Accordingly, it is possible to keep supplying the gasoline without increasing the pressure within the gasoline tank 1.

In addition, in supplying the gasoline, when the level of the liquid gasoline reaches the A–A' position placed at the bottom end of the major through holes 51, the ventilation resistance against the gas flowing through the major through holes 51 enlarges sharply thereafter. Moreover, the minor through holes 50 are formed to have such a minor diameter that they exhibit a large ventilation resistance inherently. Therefore, a differential pressure arises between the vapor phase within the gasoline tank 1 and the vapor phase within the housing 3 to ascend the level of the liquid gasoline within the housing 3. Accordingly, the floating valve 4 closes the evaporator opening 63 to shut off the ventilation. Consequently, the pressure within the gasoline tank 1 heightens at once. As a result, the gasoline tank 1 is detected that it is filled up with the gasoline. Thus, it is possible to promote to automatically turn off fuel supply guns.

When the gasoline tank 1 is filled up with the gasoline, the gas within the gasoline tank 1 flows into the housing 3 through the minor through holes 50 and communication holes 64, and flows toward the canister through the evaporator opening 63. Moreover, when the level of the liquid gasoline waves so that the liquid gasoline comes into the housing 3, the floating valve 4 floats upward to close the evaporator opening 63. Accordingly, it is possible to inhibit the liquid gasoline from flowing into the canister.

The flow-out fuel inhibitor apparatus according to Example No. 1 is manufactured in the following manner, for instance. The valve seat 47 and valve body 48 are first installed to the floating valve 4. The resulting sub-assembly is accommodated in the cylinder 66 of the upper member 60. Then, the upper member 60 and lower member 61 are fastened by engagement to form the inner container 6. The inner container 6 is fastened to the outer container 5 by way of the O-ring 62 by engagement. Thereafter, the opening end of the outer container 5 is fastened to the lid 2 by welding. The resulting module is fitted into the evaporator opening of the gasoline tank 1. Finally, the lid 2 is welded to the periphery of the evaporator opening of the gasoline tank 1.

Therefore, even when the gasoline tank 1 is formed as a variety of shapes or is formed to have a variety of capacities, it is possible to adjust the detecting position at which the gasoline tank 1 is detected to be filled up with gasoline by simply adjusting the position or opening shape of the major through holes 51. Moreover, it is possible to remarkably reduce the cost of the flow-out fuel inhibitor apparatus according to Example No. 1 because the number of the component parts is less. In addition, the flow-out fuel inhibitor apparatus according to Example No. 1 requires a less boarding space and offers a high degree of freedom when it is disposed in vehicles, because the housing 3 provided with the floating valve 4 can be fastened by welding to a portion of the gasoline tank 1 with an extremely small area.

Moreover, even when the position at which the gasoline tank 1 is detected to be filled up with gasoline is placed adjacent to the position at which the supply of gasoline is cut off or fuel supply guns are promoted to automatically turn off, the floating valve 4 is subjected to sufficient buoyancy. Accordingly, it is unnecessary to enlarge the volume of the floating valve 4 in the horizontal direction. Therefore, one and only flow-out fuel inhibitor apparatus can be shared by a variety of fuel tanks so that it is possible to reduce the cost involved by means of mass-production.

Example No. 2

Figure 3:
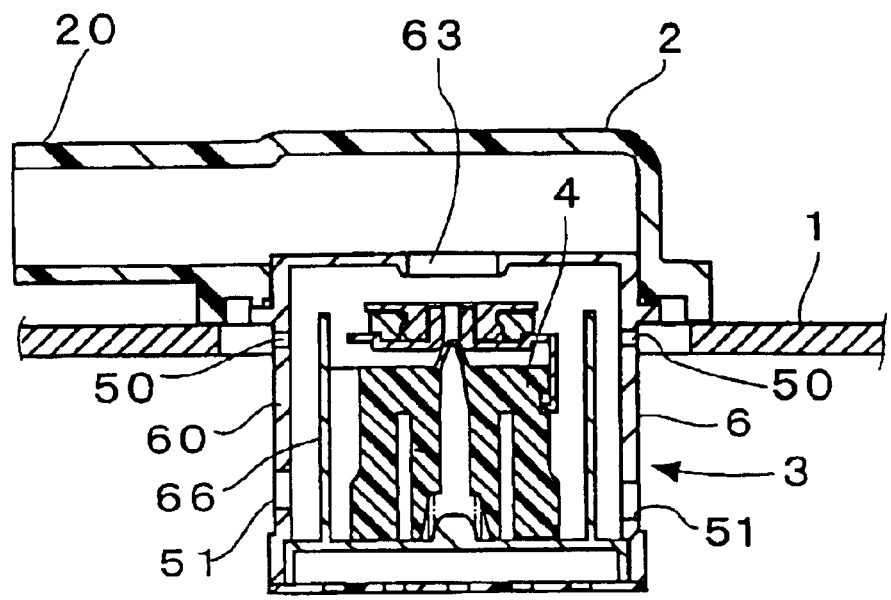
FIG. 3 is a cross-sectional view a flow-out fuel inhibitor apparatus according to Example No. 2 of the present invention.

FIG. 3 illustrates a flow-out fuel inhibitor apparatus according to Example No. 2 of the present invention. In the flow-out fuel inhibitor apparatus, an inner container 6 alone makes a housing 3. An upper member 60 is fixed to a lid 2 by welding. In the peripheral wall of the upper member 60, minor through holes 50 and major through holes 51 are formed. Except for these features, the flow-out fuel inhibitor apparatus according to Example No. 2 has the same arrangements as those of Example No. 1.

The flow-out fuel inhibitor apparatus according to Example No. 2 operates and produces advantages in the same manner as Example No. 1.

Figure 4:
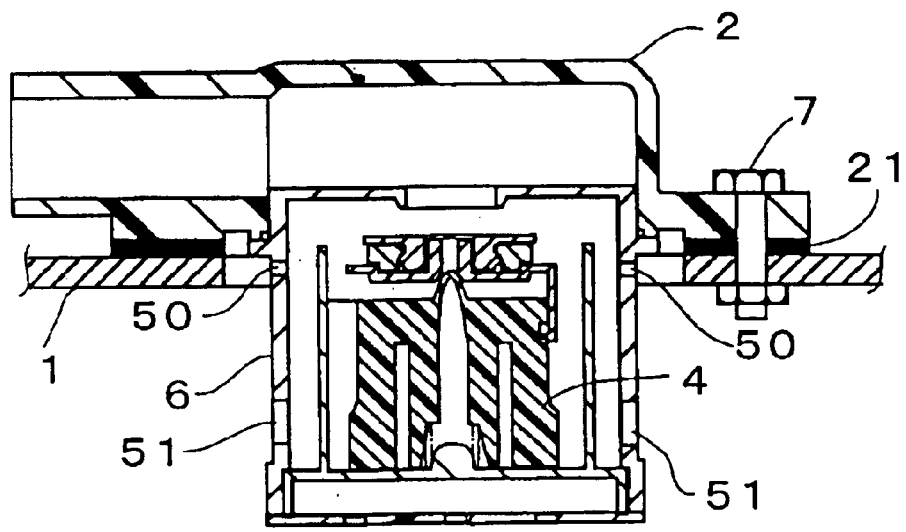
FIG. 4 is a cross-sectional view for illustrating a modified way for fastening the flow-out fuel inhibitor apparatus according to Example No. 2 to a fuel tank.
Figure 5:
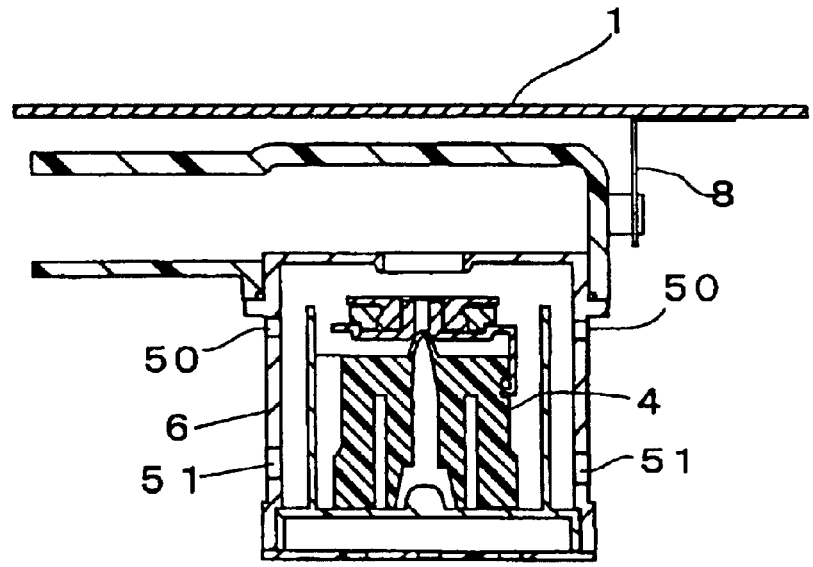
FIG. 5 is a cross-sectional view for illustrating still another modified way for fastening the flow-out fuel inhibitor apparatus according to Example No. 2 to a fuel tank.
Figure 6:
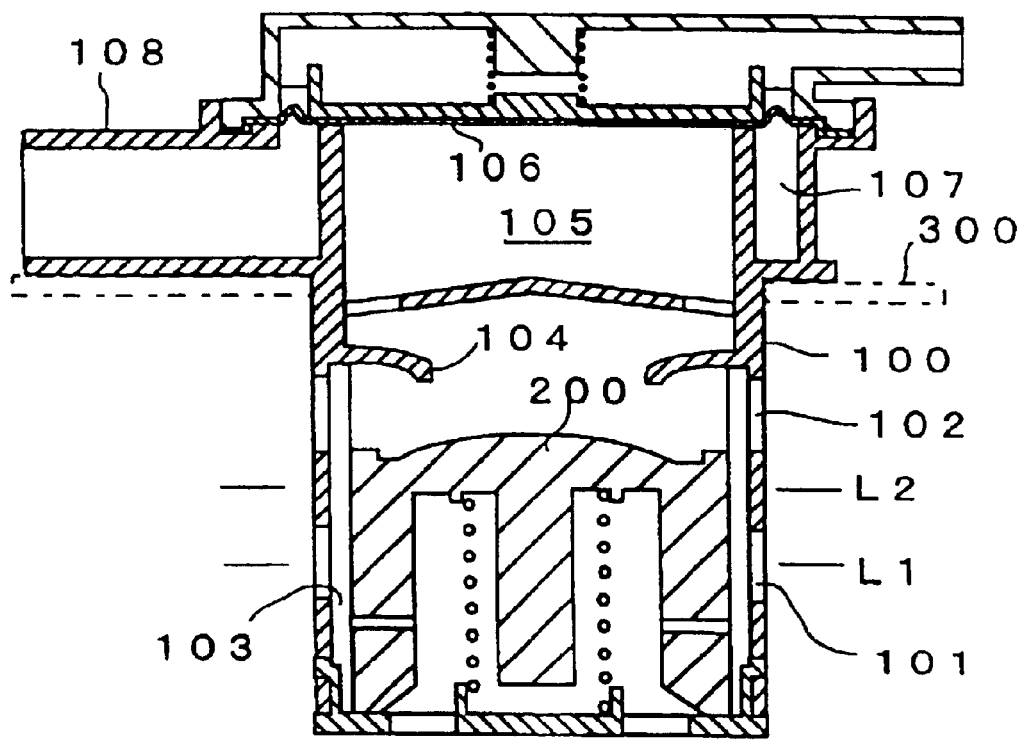
FIG. 6 is a cross-sectional view of a conventional flow-out fuel inhibitor apparatus.

The flow-out fuel inhibitor apparatus according to Example No. 2 is fixed to a gasoline tank 1 by welding the lid 2 to the gasoline tank 1. However, as illustrated in FIG. 4, the flow-out fuel inhibitor apparatus can be fixed to the gasoline tank 1 by fastening the lid 2 to the gasoline tank 1 with a bolt by way of a packing 21. Alternatively, as illustrated in FIG. 5, the flow-out fuel inhibitor apparatus can be fixed within the gasoline tank 1 by using an installation fitting 8 in a suspended manner.

Moreover, it is needless to say that a variety of bonding or engaging means such as welding and claw engagements can be used as the structures for assembling the lid 2, upper member 60 and lower member 61 in addition to those described in Example Nos. 1 and 2.

Having now fully described the present invention, it will be apparent to one of ordinary skill in the art that many changes and modifications can be made thereto without departing from the spirit or scope of the present invention as set forth herein including the appended claims.

What is claimed is:

1. An apparatus for inhibiting fuel from flowing out of fuel tanks, the apparatus comprising:

a housing fixed to a top of a fuel tank, and having an evaporator opening communicating with a canister, wherein a major-diameter major through-hole is formed in a side surface of the housing, and the major-diameter major through-hole communicates the inside of the housing with the outside of the housing, and the major-diameter major through-hole has an opening width that is sharply reduced from wide to narrow in the direction from a bottom thereof to a top thereof, such that filling-up of the fuel tank with the liquid fuel is detected through an increase in gas pressure within the fuel tank when the level of the liquid fuel within the fuel tank is adjacent to the top end of the major-diameter major through-hole; and a floating valve accommodated in the housing, wherein the floating valve floats on a liquid fuel, and moves up and down in accordance with up-and-down movements of a level of the liquid fuel to open or close the evaporator opening, wherein the evaporator opening is closed with the floating valve when the level of the liquid fuel rises abnormally.

2. The apparatus set forth in claim 1, wherein an opening of the major through hole has a substantially triangular shape, one apex of which points upward and at least an upper portion of each of two sides of the substantially triangular shape, which extend in a generally downward direction from the upward-pointing apex is arcuate and downwardly convex.

3. The apparatus set forth in claim 2, wherein the substantially triangular shape has a base length "l" and a height "h"; and the ratio of "l" with respect to "h" falls in a range of from more than 1 (not inclusive) to less than 3 (not inclusive).

4. The apparatus set forth in claim 1, wherein the floating valve is provided with a cylinder formed on an outer periphery thereof, opened upward and disposed within the housing.

5. The apparatus set forth in claim 1, wherein the housing further has an opening, communicating with the fuel tank, at a bottom thereof.

6. The apparatus set forth in claim 1, wherein the housing has a plurality of the major through holes formed on a common horizontal plane in a side surface of the housing.

7. The apparatus set forth in claim 1, wherein the housing further has a minor-diameter minor through hole disposed in a side surface of the housing and in the vicinity of a top inner surface of the fuel tank and communicating the inside of the housing with the outside.

* * * * *